United States Patent
Maris

(10) Patent No.: US 7,641,832 B2
(45) Date of Patent: Jan. 5, 2010

(54) PROCESS FOR THE CONTINUOUS PRODUCTION OF A COMPOSITION COMPRISING RUBBER, HYDROCARBON RESIN AND SOLVENT

(75) Inventor: Gianfranco Maris, Rivoli (IT)

(73) Assignee: F.LLI MARIS S.p.A., Turin (IT)

( * ) Notice: Subject to any disclaimer, the term of this patent is extended or adjusted under 35 U.S.C. 154(b) by 338 days.

(21) Appl. No.: 10/574,481

(22) PCT Filed: Sep. 29, 2004

(86) PCT No.: PCT/EP2004/010874

§ 371 (c)(1),
(2), (4) Date: Dec. 1, 2006

(87) PCT Pub. No.: WO2005/030457

PCT Pub. Date: Apr. 7, 2005

(65) Prior Publication Data

US 2008/0023876 A1    Jan. 31, 2008

(30) Foreign Application Priority Data

Oct. 1, 2003   (IT)   .......................... TO2003A0764

(51) Int. Cl.
B29C 47/38    (2006.01)
B29C 47/40    (2006.01)
B29C 47/50    (2006.01)
B29C 47/60    (2006.01)

(52) U.S. Cl. .............................. 264/211.23; 264/211.21; 425/205

(58) Field of Classification Search ............ 264/211.21, 264/211.23; 425/205
See application file for complete search history.

(56) References Cited

U.S. PATENT DOCUMENTS

| 4,687,794 A | 8/1987 | Huddleston et al. |
| 4,906,421 A * | 3/1990 | Plamthottam et al. ....... 264/471 |
| 5,011,291 A * | 4/1991 | Peter ........................... 366/91 |
| 5,358,693 A * | 10/1994 | Brinkmann et al. .......... 422/137 |
| 5,550,175 A | 8/1996 | Bredahl et al. |
| 5,758,961 A * | 6/1998 | Deal et al. .................. 366/76.1 |
| 7,004,616 B2 * | 2/2006 | Murakami et al. ............ 366/75 |
| 7,017,732 B2 * | 3/2006 | Uphus ........................ 198/663 |
| 2002/0060378 A1 * | 5/2002 | Miyamoto et al. .......... 264/211 |
| 2005/0069601 A1 * | 3/2005 | Uphus ........................ 425/205 |

(Continued)

FOREIGN PATENT DOCUMENTS

CN    1272520 A    11/2000

(Continued)

OTHER PUBLICATIONS

Satas, Don. Handbook of Pressure-Sensitive Adhesive Technology. New York: Van Nostrand Reinhold Company Inc., 1982.*

(Continued)

*Primary Examiner*—Khanh Nguyen
*Assistant Examiner*—Carson Gross
(74) *Attorney, Agent, or Firm*—Sughrue Mion, PLLC

(57) ABSTRACT

The process for the continuous production of a composition comprising rubber (20), a hydrocarbon resin (22) and a solvent (26) provides for the use of at least two two-screw extruders (10a, 10b) placed in series. These extruders may be of the contrarotating type or, preferably, co-rotating.

15 Claims, 2 Drawing Sheets

U.S. PATENT DOCUMENTS

2005/0087906 A1* 4/2005 Caretta et al. ............... 264/211

FOREIGN PATENT DOCUMENTS

EP 0 304 904 A2 3/1989
EP 0 774 481 A1 5/1997

OTHER PUBLICATIONS

Utracki, L.A. Polymer Blends Handbook, vols. 1-2. Springer-Verlag, 2002.*

"Chemical Encyclopedia", "Bolshaya Rossyskaya Encyclopedia" edition, Moscow, 1995, vol. 4, pp. 443, 444.

* cited by examiner

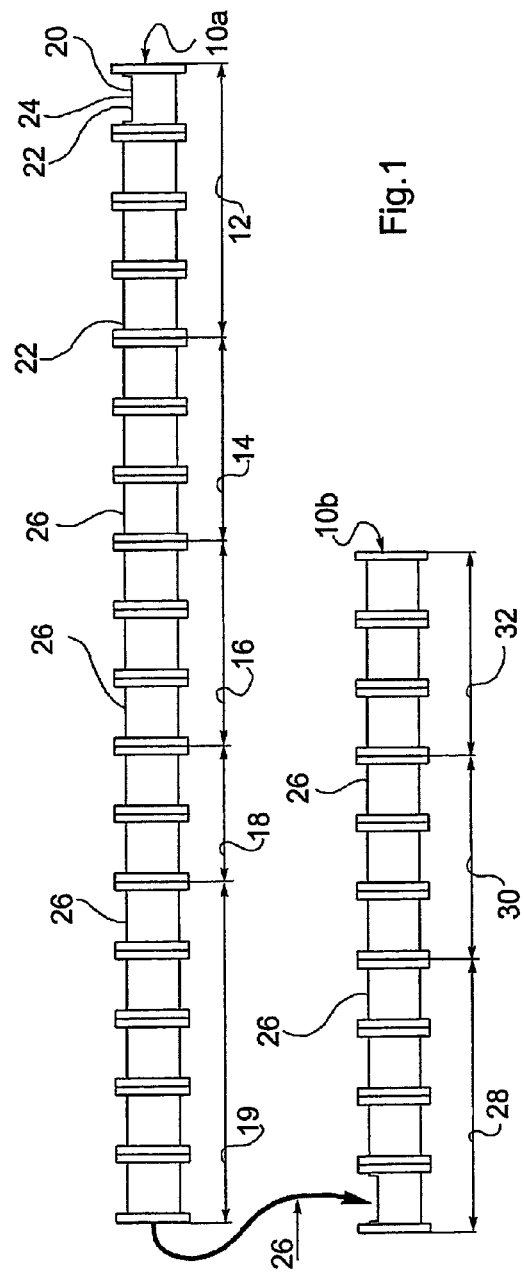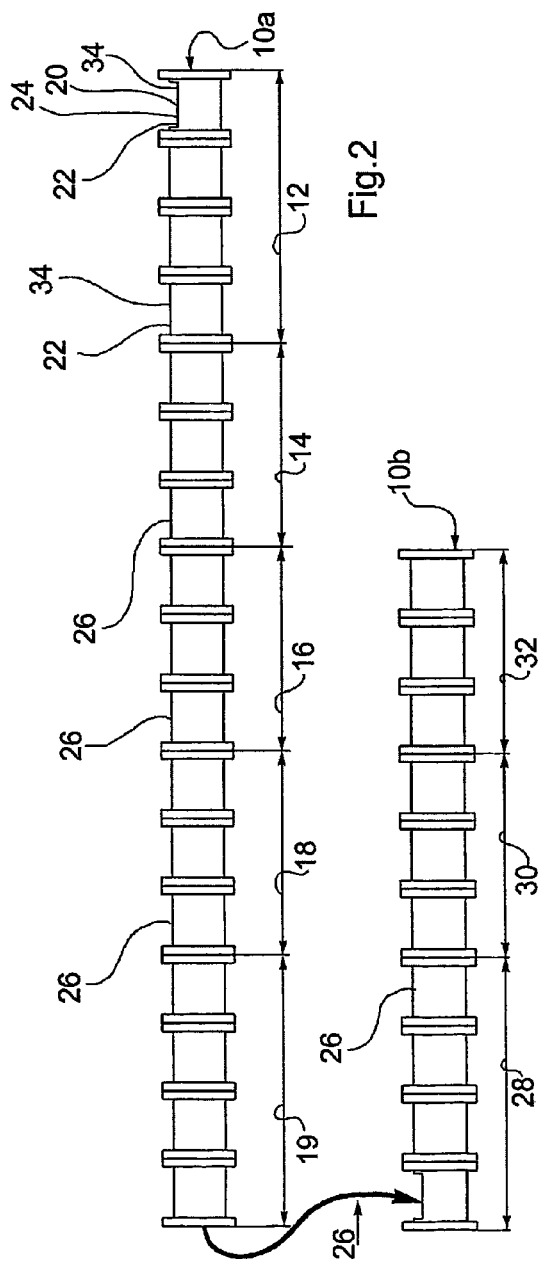

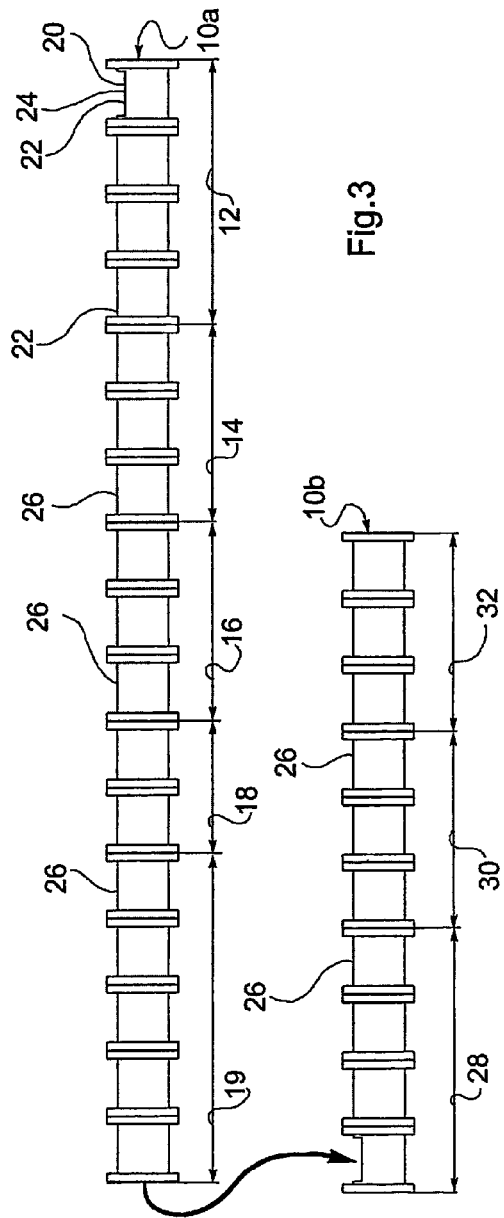
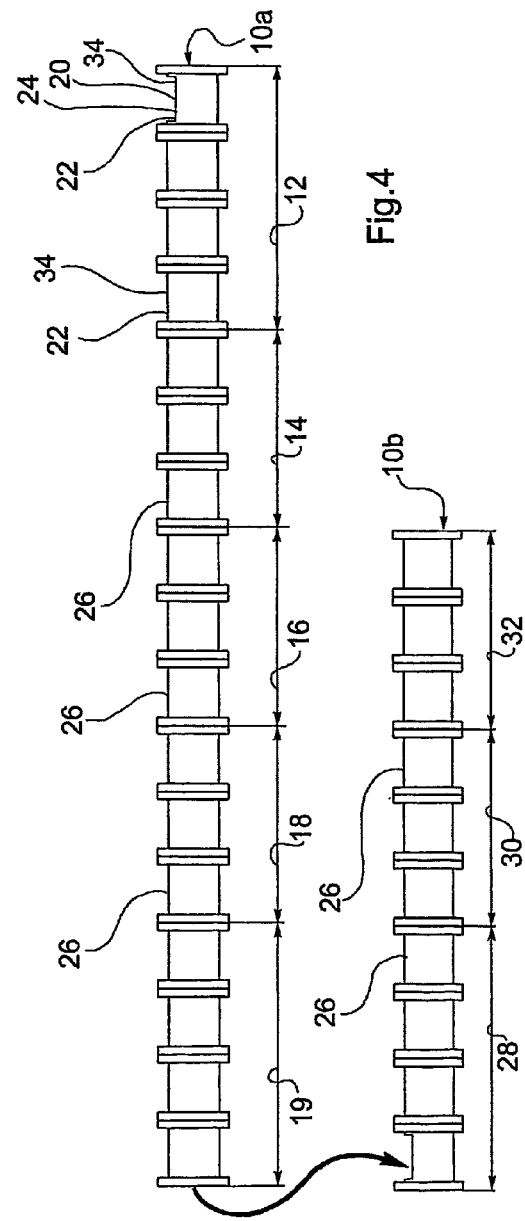

PROCESS FOR THE CONTINUOUS PRODUCTION OF A COMPOSITION COMPRISING RUBBER, HYDROCARBON RESIN AND SOLVENT

This invention relates to a process for the continuous production of a composition comprising rubber, hydrocarbon resin and solvent, in particular an adhesive formulation.

The object of this invention is that of providing an improved process of the abovementioned type, in particular having marked versatility and which can be implemented through machinery of limited size.

This object is achieved through a production process of the type indicated above, which is implemented through the use of two or more two-screw extruders placed in series.

The use of several extruders placed in series allows very much greater flexibility in installation than in the case where a single extruder is used. The latter must in fact necessarily be of a very great length and is therefore not easily fitted into small spaces, apart from being intrinsically complex to make from the construction point of view.

In addition to this, the use of separate extruders makes it possible to select the corresponding process parameters, such as temperature and rate of rotation of the screws and the like, independently and freely, so that the extrusion process, can be adapted to specific operating requirements with great versatility. Advantageously the temperature at the outlet of each extruder is less than the boiling point of the solvent in which the other ingredients are dissolved.

The two-screw extruders which can be used are of a conventional type, advantageously of the co-rotating type. Two-screw extruders of the contrarotating type may however be used. The extruders used have a ratio between the outside and inside diameters of the screws which preferably lies between 1.4 and 2.0 and even more preferably between 1.55 and 1.8, in order that their outer dimensions can be substantially reduced.

If two extruders are used in series, the process according to the invention preferably provides for the addition of solvent in a fractionated way at a plurality of points downstream from the initial section of the first extruder and at a plurality of points located along the second extruder. Again preferably, a fraction of solvent is added to the composition leaving the first extruder before it enters the second extruder.

In preferred embodiments of the process according to the invention the rubber and the resin are all added to the initial section of the first extruder. As an alternative it is possible to add a fraction of the resin in the initial section of the first extruder and the remaining fraction at a point downstream from the initial section of the first extruder.

The rubber used may be selected from the group comprising natural rubbers, synthetic rubbers and their mixtures, for example styrene-isoprene-styrene (SIS), styrene-butadiene-styrene (SBS) and "natural rubber" (NR).

As is known, a hydrocarbon resin is a resin prepared through the polymerisation of unsaturated constituents of coal tar, rosin or petroleum. Preferably hydrocarbon resins having adhesion-imparting properties, for example of the type marketed by the name of Escorez or Wing-tack and their mixtures, are used.

The solvent is for example selected from the group comprising pentane, hexane, heptane, dichloropropane and their mixtures.

Further features and advantages of this invention will be apparent from the following detailed description with reference to the appended drawings, in which:

FIG. 1 diagrammatically illustrates two two-screw extruders placed in series, in which a process according to the invention is carried out, and FIGS. 2, 3 and 4 diagrammatically illustrate corresponding pairs of two-screw extruders placed in series, in which corresponding further embodiments of the process according to the invention are carried out.

A process for the continuous production of a composition comprising rubber, hydrocarbon resin and solvent provides for the use (FIG. 1) of a first two-screw extruder 10a and a second one 10b, for example of the co-rotating type, placed in series.

In first extruder 10a there is a first length 12, a second length 14, a third length 16, a fourth length 18 and a fifth length 19 in succession. First length 12 is approximately 16 D long (whereby D is meant the diameter of one of the two screws of extruder 10a), second length 14 is approximately 12 D long, third length 16 is approximately 12 D long, fourth length 18 is approximately 8 D long and fifth length 19 is approximately 20 D long.

Rubber 20, a fraction of hydrocarbon resin 22, and conventional additives 24, for example antioxidising agents, are added at the start of first length 12. The ingredients added are homogenized in first length 12.

The remaining fraction of resin 22 is added at the end of first length 12, while a first fraction of solvent 26 is added in second length 14. The remaining ingredients are dissolved in solvent 26 in second length 14.

Further fractions of solvent 26 are added respectively in third and fifth lengths 16, 19. Further dissolution of the remaining ingredients in solvent 26 takes place in lengths 16, 18 and 19.

The temperature when the composition obtained leaves first extruder 10a must necessarily be lower than the boiling point of solvent 26 at the process pressure. A further fraction of solvent 26 is then added to the composition leaving first extruder 10a, before it is placed in second extruder 10b. Advantageously the overall fraction of solvent placed in first extruder 10a or added to the composition leaving it comprises between 50 and 80% of the total. The remaining fraction is added in second extruder 10b.

Within the latter there is a first length 28, a second length 30 and a third length 32 in succession. The first length 28 is approximately 16 D long (whereby D is meant the diameter of one of the two screws of extruder 10), second length 30 is approximately 12 D long and third length 32 is approximately 12 D long.

Further fractions of solvent 26 are added to first and second lengths 28, 30 respectively. Further dissolution of the remaining ingredients in solvent 26 takes place in lengths 28, 30, 32. Also the temperature of the composition obtained at the outlet from second extruder 10b must necessarily be less than the boiling point of solvent 26 at the process pressure. Advantageously the temperature of the composition within second extruder 10b is less than the temperature of the composition within first extruder 10a. The rotation speed of the screws of first extruder 10a lies for example between 20 and 300 rpm, while the rotation speed of the screws of second extruder lob lies for example between 60 and 600 rpm. These rotation speeds may be adjusted independently of each other, so that the viscosity of the final composition can be controlled in the desired way. Preferably the rotation speed of the screws of second extruder 10b is greater than that of the screws of first extruder 10a.

Another embodiment of the production process according to the invention is illustrated with reference to FIG. 2. A first change in comparison with the preceding instance lies in the fact that solvent 26 is not added in second length 30 of second extruder 10b. A second change in comparison with the preceding instance lies in the fact that masterbatch 34 (comprising a concentrated mixture of dye in the resin) is added at the points where resin 22 is added.

Yet another embodiment of the production process according to the invention is illustrated with reference to FIG. 3. The only change in comparison with the situation in FIG. 1 lies in the fact that no solvent 26 is added to the composition leaving first extruder 10a before it is placed in second extruder 10b.

Another embodiment of the production process according to the invention is illustrated with reference to FIG. 4. In this case first length 12 of first extruder 10a is 28 D long, equivalent to the sum of the lengths of the first and second lengths of the first extruder in FIG. 3. In addition to this the whole quantity of resin 22 is added to the initial section of first length 12, after which the first addition of solvent 26 is instead made. The structure of the remaining parts of first extruder 10a and all of second extruder 10b, and the ways of adding the remaining fractions of solvent 26 remain unchanged in comparison with what has been described with reference to FIG. 3.

Of course, while the principle of the invention remains unchanged, details of embodiments and embodiments may vary widely from what has been described purely by way of example without thereby going beyond its scope.

The invention clamed is:

1. A process for producing an adhesive composition, comprising the following steps:
   providing first and second two-screw extruders in series with one another, the first extruder being located upstream of the second extruder;
   supplying rubber, a hydrocarbon resin and a solvent to the first extruder such that the rubber and hydrocarbon resin are dissolved in the solvent; and
   controlling the temperature of the extruders such that the temperature at the outlet of each of the extruders is less than the boiling point of the solvent.

2. Production process according to claim 1, wherein said solvent (26) is added at at least one point downstream from an initial section of the first extruder (10a).

3. Production process according to claim 1 wherein said solvent is added in a fractionated way at a plurality of points downstream from the initial section of the first extruder and at a plurality of points located along the second extruder.

4. Production process according to claim 3, wherein a fraction of said solvent is added to the composition leaving the first extruder before it is placed in the second extruder.

5. Production process according to claim 1, wherein the said rubber is added in an initial section of the first extruder.

6. Production process according to claim 1, wherein the said resin is added in an initial section of the first extruder.

7. Production process according to claim 1, wherein a fraction of the said resin is added to an initial section of the first extruder and the remaining fraction is added at a point downstream from the initial section of the first extruder.

8. Production process according to claim 1, wherein the rotation speed of the screws of the first extruder (10a) lies between 20 and 300 rpm, while the rotation speed of the screws of the second extruder (10b) lies between 60 and 600 rpm.

9. Production process according to claim 1, wherein said rubber is selected from the group comprising natural rubbers, synthetic rubbers and mixtures thereof.

10. Production process according to claim 1, wherein said hydrocarbon resin has adhesion-imparting properties.

11. Production process according to claim 1, wherein the said solvent is selected from the group consisting of pentane, hexane, heptane, dichioropropane and mixtures thereof.

12. Production process according to claim 1, wherein said at least two two-screw extruders are of the co-rotating type.

13. Production process according to any one of the preceding claims, wherein at least one of said at least two two-screw extruders has a ratio between the outer diameter and the inner diameter of the screws lying between 1.4 and 2.0.

14. Production process according to claim 1, wherein the temperature of the composition within the second extruder is less than the temperature of the composition in the first extruder.

15. Production process according to claim 1, wherein at least one of said at least two two-screw extruders has a ratio between the outer diameter and the inner diameter of the screws lying between 1.55 and 1.8.

* * * * *